(12) United States Patent
Carlson et al.

(10) Patent No.: US 6,754,780 B1
(45) Date of Patent: Jun. 22, 2004

(54) PROVIDING DATA IN RESPONSE TO A READ COMMAND THAT MAINTAINS CACHE LINE ALIGNMENT

(75) Inventors: Jeff M. Carlson, Cypress, TX (US); Ryan A. Callison, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/542,969

(22) Filed: Apr. 4, 2000

(51) Int. Cl.[7] .............................................. G06F 12/00
(52) U.S. Cl. ...................... 711/137; 711/113
(58) Field of Search ............................... 711/137, 201, 711/213, 219; 710/207, 204

(56) References Cited

U.S. PATENT DOCUMENTS

| | | | |
|---|---|---|---|
| 5,586,248 A | | 12/1996 | Alexander et al. |
| 5,623,625 A | | 4/1997 | Thompson et al. |
| 5,692,200 A | | 11/1997 | Carlson et al. |
| 5,809,280 A | | 9/1998 | Chard et al. |
| 5,835,967 A | * | 11/1998 | McMahan ................... 711/213 |
| 6,021,480 A | * | 2/2000 | Pettey ......................... 711/201 |
| 6,330,630 B1 | * | 12/2001 | Bell ............................ 710/219 |
| 6,341,335 B1 | * | 1/2002 | Kanai ......................... 711/137 |

OTHER PUBLICATIONS

Yim, et al., "Single Cycle Access for the Misaligned Data and Instruction Prefetch", Mar. 1997, IEEE.*

Intel® 21050 PCI–to–PCI Bridge Evaluation Board User's Guide, Sep. 1998, © Intel Corporation 1998, pp. i–iv, 1-1-3-2.

PCI Local Bus Specification, Revision 2.2, Dec. 1998, ©1992, 1993, 1995, 1998 PCI Special Interest Group, pp. i–ii, 47–49, 198.

PCI Local Bus, PCI–to–PCI Bridge Architecture Specification, Revision 1.1, Dec. 1998, ©1994, 1998, PCI Special Interest Group, pp. 1–2, 11–13, 46–47, 57–66, 69–70.

PCI Local Bus, PCI–X Addendum to the PCI Local Bus Specification, Revision 1.0, Sep. 1999, ©1999 PCI Special Interest Group, pp. 1–2, 34–37, 40–41, 93–95, 146–147.

* cited by examiner

*Primary Examiner*—Kimberly McLean-Mayo

(57) ABSTRACT

Efficient memory operation is provided by maintaining alignment with cache line boundaries in response to a read command. A prefetching scheme is used to limit the amount of operations needed to respond to a read command. In addition, the prefetch amount is initially adjusted where the starting address of the read request falls in between cache line boundaries. The adjusted read amount is determined based on the misaligned portion from the starting address of the read request to the nearest cache line boundary outside of the requested data block, such that the adjusted read amount ends on a cache line boundary. Subsequent read requests to the same data block will thereby begin at the last cache line boundary and end upon a subsequent cache line boundary by providing the pre-configured prefetch data amount corresponding to the requesting master device. Efficient bus utilization and memory controller operation efficiency is maximized by allowing the memory control to operate and respond to read requests in data amounts maintaining cache line alignment.

30 Claims, 6 Drawing Sheets

| Data Requested | Read Operation | Prefetch Amount (bytes) | Misaligned Amount (bytes) | Adjusted Read Amount (bytes) | Memory Line |
|---|---|---|---|---|---|
| Block 1 | ① | 256 | 16 Ⓐ | 240 | 1 |
|  | ② | 256 | 0 | 256 | 2 |
|  | ③ | 256 | 0 | 256 | 2 |
|  | ④ | 256 | 0 | 256 | 3 |
|  | ⑤ | 256 | 0 | 256 | 3 |
|  | ⑥ | 256 | 0 | 256 | 4 |
|  | ⑦ | 256 | 0 | 256 | 4 |
| Block 2 | ① | 128 | 48 Ⓑ | 80 | 4 |
|  | ② | 128 | 0 | 128 | 4 |
|  | ③ | 128 | 0 | 128 | 5 |
|  | ④ | 128 | 0 | 128 | 5 |
| Block 3 | ① | 256 | 32 Ⓒ | 224 | 5 |
|  | ② | 256 | 0 | 256 | 6 |
|  | ③ | 256 | 0 | 256 | 6 |
|  | ④ | 256 | 0 | 256 | 6 |
|  | ⑤ | 256 | 0 | 256 | 6 |

Figure 5

PROVIDING DATA IN RESPONSE TO A READ COMMAND THAT MAINTAINS CACHE LINE ALIGNMENT

RELATED APPLICATIONS

This application is related to co-pending, concurrently filed, and commonly assigned U.S. Patent Applications which are hereby incorporated by reference as if set forth in their entirety:

U.S. patent application Ser. No. 09/542,760, now U.S. Pat. No. 6,370,616, entitled MEMORY INTERFACE CONTROLLER FOR DATUM RAID OPERATIONS WITH A DATUM MULTIPLIER, filed concurrently by Ryan A. Callison, Christopher Garza, Albert H. Chang, and Hubert E. Brinkmann, Jr.;

U.S. patent application Ser. No. 09/542,624 now U.S. Pat. No. 6,370,611, entitled RAID XOR OPERATIONS TO SYNCHRONOUS DRAM USING A READ BUFFER, filed concurrently by Ryan A. Callison, William C. Galloway, Christopher Garza, and Albert H. Chang;

U.S. patent application Ser. No. 09/542,309, entitled DYNAMIC ROUTING OF DATA ACROSS MULTIPLE DATA PATHS FROM A SOURCE CONTROLLER TO A DESTINATION CONTROLLER, filed concurrently by Hubert E. Brinkmann, Jr. and Ryan A. Callison;

U.S. patent application Ser. No. 09/542,157, entitled DISCONNECTING A DEVICE ON A CACHE LINE BOUNDARY IN RESPONSE TO A WRITE COMMAND, filed concurrently by Jeff M. Carlson and Ryan A. Callison; and U.S. patent application Ser. No. 09/542,470 now U.S. Pat. No. 6,581,130, entitled DYNAMIC REMAPPING OF ADDRESS REGISTERS FOR ADDRESS TRANSLATION BETWEEN MULTIPLE BUSSES, filed concurrently by Hubert E. Brinkrnann, Jr. and Ryan A. Callison.

BACKGROUND OF THE INVENTION

1. Field of the Invention

The invention relates to bridge devices in multicontroller computer applications, and more particularly, to improving bus utilization efficiency during data transfer operations among the system controllers.

2. Description of the Related Art

Inclusion of multiple microcontroller devices within a single application specific integrated circuit (ASIC) has become common place. As the size of ASIC computer chips decrease and system speeds increase, system efficiency is scrutinized at every level. Communications among the multiple controllers in a system or on an ASIC present one part of the larger computer system efficiently that ultimately affects overall system speed. Data transfer, including read and write operations to system memory and even among the ASIC controllers, are required to be efficient or risk choking overall system speeds as devices wait for bus operations to catch up to internal processes. To make matters more complex, the various controllers and the system memory often reside on multiple computer communications buses. As such, bridge-type devices have become a common component to facilitate data transfers among the different bus interfaces. However, "dumb" bridges serve to introduce additional latencies without efficiency improvement.

One communication protocol, utilized in PCI-X systems, requires providing the amount of data to be transferred as a byte count at the start of a cycle along with the command and address. Another protocol uses a FRAME# signal to indicate when the initiating device intends to continue transferring data past the first data phase. The FRAME# signal remains asserted until the next to last transfer that the initiating device intends to complete.

One approach has been to minimize the number of operations needed to complete a particular task. Device characteristics, if known, can be used to predict a data transfer mode that could improve efficiency. To this end, ASICs have been designed to provide configuration blocks in which registers can be set during initial configuration based on device characteristics of the devices among which the ASIC knows communication will occur. Data can then be provided in response to a read request from any one of the controllers based on the amount of data set in the configuration register for that requesting device. This "prefetching" scheme reduces overhead where device characterstics are static during particular operations. Once the preferred data response is known, the responding device, such as a memory controller, is able to automatically provide data without additional internal computing operations. However, standard prefetching does not take advantage of inherent operating efficiencies of certain responding devices, like a memory controller. For example, memory controllers are generally more efficient responding to a read request when it operates on cache line boundaries (i.e. responding by providing data in amounts equal to a cache line and aligned with its cache boundaries). However, if a read request begins misaligned from a cache line boundary, the above prefetching scheme will serve only to perpetuate the misalignment across a large data stream through its standardization of subsequent read amounts.

SUMMARY OF THE INVENTION

The bridge device according to the present invention maintains cache line alignment during read operations between the bridged devices. The amount of data read in response to a read command from any potentially requesting controller or other requesting device is preset. If the starting address of the read request is misaligned with respect to a memory cache line boundary, the preset prefetch amount is recalculated such that the ending address will be aligned on a cache line boundary. An amount of data equal to this adjusted amount is returned in response to the read request instead of the preset prefetched amount. The next request to a continuous data stream in memory will thus automatically begin cache-line aligned. Successive starting read requests continue returning the preset prefetch amount as long as the address is aligned with a cache line boundary. Host memory controller efficiency is maximized by providing subsequent read request starting on cache line boundaries for large data streams.

BRIEF DESCRIPTION OF THE DRAWINGS

A better understanding of the present invention can be obtained when the following detailed description of the preferred embodiment is considered in conjunction with the following drawings, in which:

FIG. 5 is a chart illustrating exemplary responsive read operations according to the disclosed techniques.

DETAILED DESCRIPTION OF THE PREFERRED EMBODIMENT

Figure 1:
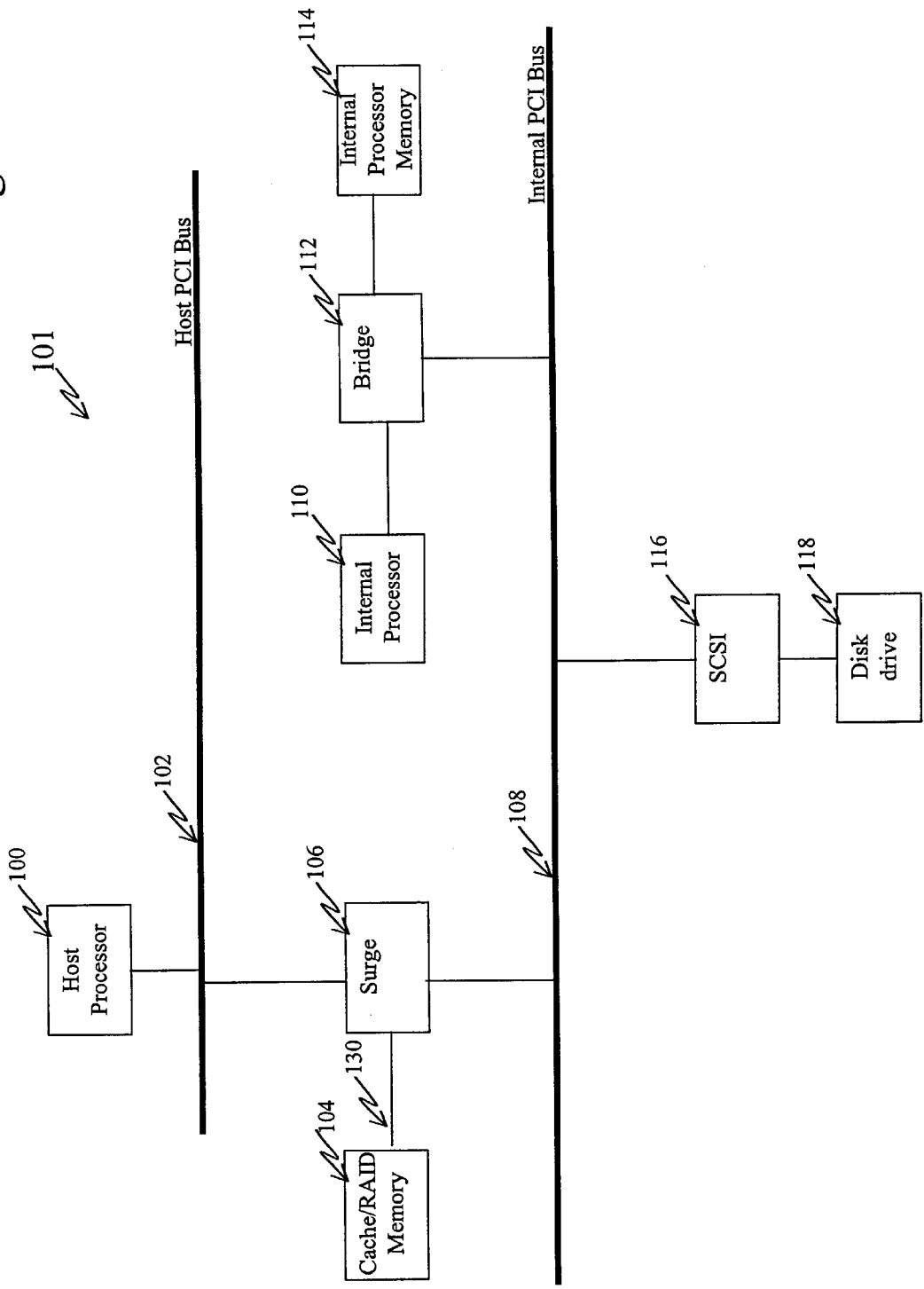
FIG. 1 is a block diagram of the computer system having a bus interface device in accordance with the present invention.

Referring now to FIG. 1, a block diagram of a disk subsystem 101 is shown. A Host Processor 100 is connected to a host PCI (Peripheral Component Interconnect) bus 102, which provides a communications channel to other components of a host computer system (not shown). The disk controller 101 also includes an internal PCI bus 108, which, like the host PCI bus 102, includes a control portion and a multiplexed address and data portion. Both buses 102 and 108 are capable of 66 MHz and 64-bit operation. For a description of the PCI bus standard, refer to PCI Specification, Revision 2.2, (December 1998), Intel Corporation of Santa Clara, Calif., which is hereby incorporated by reference as if set forth in its entirety.

Coupled to the internal PCI bus 108 is an internal or local processor 110 that controls the functions of the devices coupled to the internal PCI bus 108, for example. The Internal Processor 110 is coupled to a Internal Processor memory 114. Both the Internal Processor 110 and the Internal Processor memory 114 are coupled through a processor PCI bridge 112 to the internal PCI bus 108. The Internal Processor 110 executes firmware stored in the Internal Processor memory 114 to perform various disk controller functions.

The processor PCI bridge 112 can be implemented with an ASIC. Further, the processor PCI bridge 112 can include logic for converting processor memory or I/O cycles into PCI cycles, and as well can include processor-to-PCI write posting buffers. The processor-PCI bridge 112 also can include a memory controller for controlling operations to the Internal Processor memory 114. Additionally, interval timers and an interrupt controller are included in the processor-PCI bridge 112.

Also connected to the internal PCI bus 108 is at least one SCSI controller 116 for interfacing with a disk drive 118. Multiple SCSI controllers and associated disk drives may be added to create a disk array subsystem.

Transactions between the host PCI bus 102 and the internal PCI bus 108 are bridged by a bus/memory interface device 106. The bus/memory interface device 106 has at least two modes of operation. In one mode, the bus/memory interface device 106 operates as a "pass-through" or PCI-to-PCI bridge device, directly passing transactions between the host PCI bus 102 and the internal PCI bus 108. The bus/memory interface device 106 also operates in a non-bridge mode, whereby transactions between the host PCI bus 102 and the internal PCI bus 108 are first translated by the bus/memory interface device 106 before being sent to their destination.

In the non-bridge mode, the bus/memory interface device 106 provides address and data translation between two or more bus interfaces, specifically between buses having non-matching address spaces. Where a conflict exists between an address in the address space for the Internal Processor 110 or the internal PCI bus 108 and an address in the address space for the Host Processor 100 or the host PCI bus 102, the bus/memory interface device 106, in the non-bridge mode, remaps the incoming transaction and translates the address originating from the originating bus into a different, but corresponding, outgoing address within the address space of the receiving or destination bus. Additionally, the bus/memory interface device 106 performs its address translations in a bi-directional manner. For example, a request issued by the Host Processor 100 passes from the host PCI bus 102 in the host PCI address space to the bus/memory interface device 106. The incoming address is then translated to the appropriate corresponding address within the address space of the internal PCI bus 108. Likewise, the Internal Processor 110 communicates with the Host Processor 100 by issuing a request in its internal PCI bus address space to the bus/memory interface device 106 where the request is translated to a corresponding address within the address space for the host PCI bus 102. Conventional PCI bridges have performed address translation.

The translation task is performed by the bus/memory interface device 106 using a system of internal programmable translation registers. The translation registers may be programmed on a per access basis by any device involved in a particular transaction. This allows all translations to occur between differing address spaces, dynamically, at a run-time level. For example, a first transaction may be initiated by a device instructing the bus/memory interface device 106 to configure its translation registers in a certain manner to allow a first translation between a first set of address spaces. The translation for that particular transaction is performed according to that configuration. A second transaction which requires translation between a second set of address spaces, different from the first set, is initiated when the requesting device instructs the bus/memory interface device 106 to reconfigure the translation registers to allow for the second transaction. In this way, a run-time change in communications among various bus interfaces is handled by dynamically reconfiguring the translation registers in the appropriate manner. Dynamic reconfiguration will be discussed below in more detail.

Here a memory storage device 104 is provided as a third interface to the bus/memory interface device 106. Here again, the bus/memory interface device 106 operates in either a bridge mode, merely passing transactions directly to the memory device 104 over the memory bus 130, or in a non-bridge or I2O mode, where requests from either the host PCI bus 102 or the internal PCI bus 108 are translated into the memory space of the memory device 104. The memory device 104 may be used either for cache memory operations and/or for RAID memory operations. While PCI I/O cycles are forwarded from the host PCI bus 102 to the internal PCI bus 108 for the bridge mode, PCI I/O cycles are not claimed by the internal PCI bus 108 in the non-bridge mode. Instead, a PCI I/O in the bus/memory interface device 106 window is opened so that the Host Processor 100 can communicate with the local processor 110.

Providing cache memory off of the bus/memory interface device 106 allows for efficient internal bus utilization through increased cache bandwidth, simultaneous host PCI bus and internal PCI bus memory operations and optimized control of bus performance. In addition, both RAID and cache operations share the same memory.

The bus/memory interface device 106 is therefore capable of operating between any number of bus interfaces. Furthermore, the bus/memory interface device 106 performs the translation function in a multi-directional manner. Therefore any request originating from any interface may be dynamically translated to the appropriate address within the address space for any other destination bus interface.

Any number of bus/memory interface devices 106 and the accompanying memory device 104 may be included in a system to create an external array architecture. The advantages of multiple bus interface devices include considerably increased cache capacity, thereby increasing memory bandwidth and increased data throughput via multiple data passages. The bus/memory interface device 106 in such a multi-device architecture provides automatic routing of command or data information among and between the various communication devices and memory via pre-specified address ranges.

Figure 2:
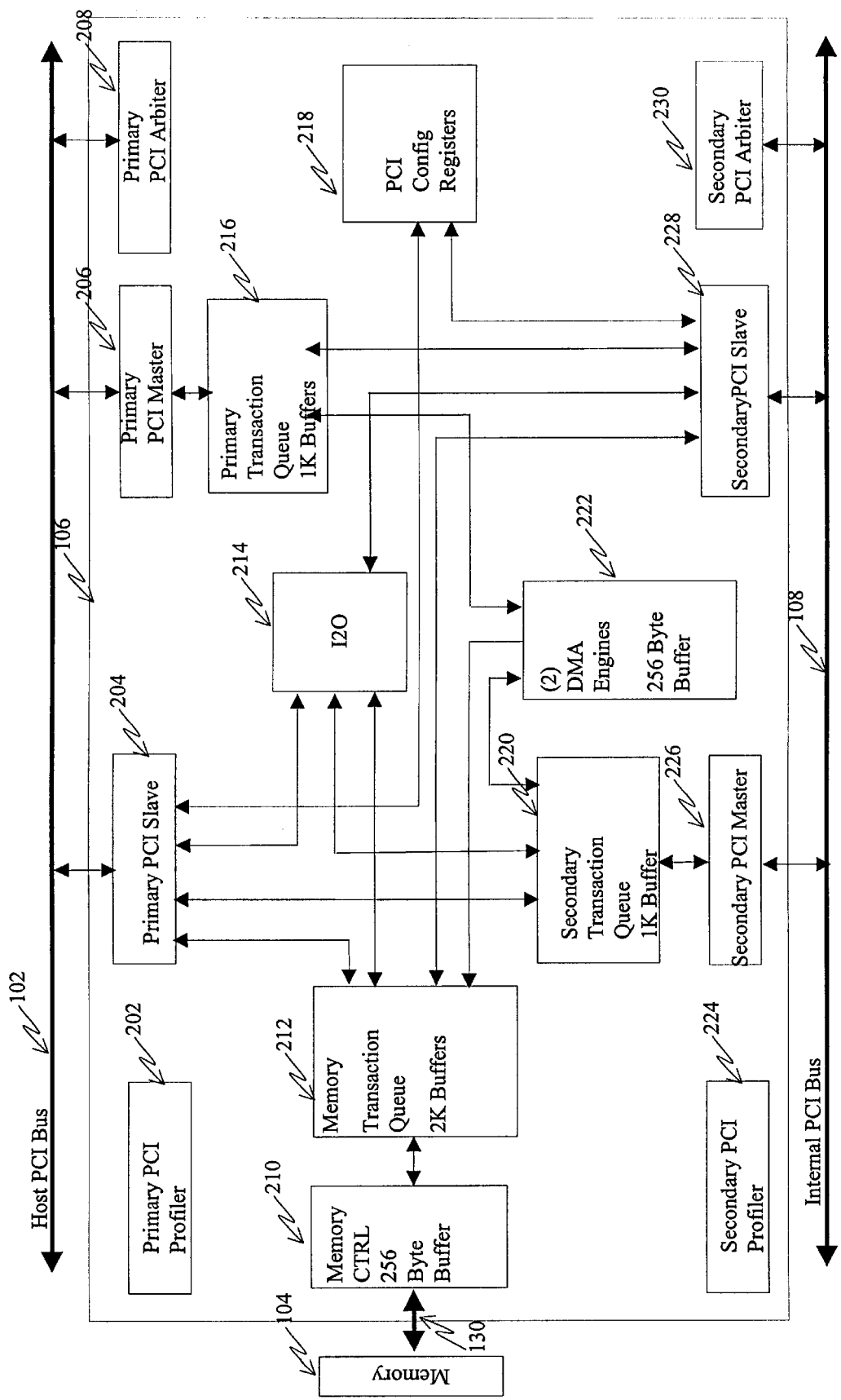
FIG. 2 is a block diagram of the internal components of the bus interface device of FIG. 1 in accordance with present invention.

Referring now to FIG. 2, a more detailed block diagram of the bus/memory interface device 106 is shown. The bus/memory interface device 106 connects to three external interfaces: the Host PCI Bus 102, the Secondary PCI Bus 108 and the Memory Bus 130. Each of the bus interfaces 102, 108 and 130 represents a different address space for the bus/memory interface device 106. The two DMA Engines 222 and the I2O control block 214 reference each bus interface as independent memory maps. Each memory space is encoded within the data structures of the DMA Engines 222 and then specified to the I2O Control Block 214 via configuration registers within the set of PCI Configuration Registers 218.

The two DMA Engines 222 are used for the automatic transfer of data for caching operations and for high speed execution of RAID operations, for example XOR functions. Each engine is capable of moving data among the three memory spaces for the host PCI bus 102, the secondary PCI bus 108 and the memory bus 130. To carry out the task of moving data between the memory spaces, the two DMA Engines 222 interface with three Transaction Queues, each transaction queue associated with one of the three bus interfaces. Therefore, the DMA Engines 222 interface with the host PCI bus 102 via the host PCI transaction queue 216. The DMA Engines 222 interface with the internal or secondary PCI bus 108 via the secondary PCI transaction queue 220. Finally, the DMA Engines 222 interface with the Memory bus 130 via the Memory transaction queue 212.

The data structures for each of the three memory maps which are encoded within the DMA Engines 222 are also utilized by the I2O Control Block 214. The I2O Control Block 214 provides a means for the host Processor 100, the Internal Processor 110 or other input/output processor (IOP) located on the Secondary PCI bus 108 to communicate by passing inbound and outbound messages in message frames. The I2O Control Block 214 supports the industry standard interface defined in the Intelligent I/O Architecture (I2O) Specification, v 1.5, which is hereby incorporated by reference as if set forth in its entirety. Like the DMA Engines 222, the I2O Control Block 214 also interfaces with each of the three Transaction Queues 212, 216 and 220 to provide communication among and between the Host PCI Bus 102, the Secondary PCI Bus 108 and the Memory Bus 130. The I2O Control Block 214 operates in one of two modes: push and pull. In the I2O push model, the Host processor 100 writes a message frame to be communicated directly into the IOP's local memory. In the I2O pull model, the Host processor 100 writes the message frame to be communicated into host memory and allows the bus/memory interface device's 106 DMA Engines 222 to copy the message frame from host memory to the IOP memory. The I2O Control Block 214 is further connected to the Host PCI Bus 102 and the Secondary PCI bus 108 via the PCI Slaves 204 and 228, respectively.

The PCI Slaves 204 and 228 provide access gateways among the Host PCI Bus 102 and the secondary PCI Bus 108 as well as to the Transaction Queues 212, 216 and 220 of the other interfaces. The PCI Slaves 204 and 228 also conduct priority decoding of transactions having conflicting address ranges.

The PCI master devices 206 and 226 provide the primary PCI functions for the bus/memory interface device 106 and are effectively compliant with the 2.1 revision of the PCI Specification. PCI Masters 206 and 226 control all transfers to their respective bus. Each PCI Master communicates with its associated transaction queue to determine the timing of the data transfers. Specifically, the Host PCI Master 206 requests control of the Host PCI Bus 102 when the appropriate amount of data is available in the Host PCI Transaction Queue 216. Likewise the Secondary PCI Master 226 requests control of the Secondary PCI Bus 108 when the Secondary PCI Transaction Queue 220 contains the appropriate amount of data. Each PCI Master is likewise capable of maintaining cache-line boundaries for read operations and each PCI slave is capable of maintaining cache-line boundaries for write operations. Maintaining cache-line boundaries for all transactions optimizes bus utilization by the bus/memory interface device 106.

As described above, the Transaction Queues 212, 216 and 220 provide the bridging mechanism between the different bus interfaces. There are three Transaction Queues, each dedicated to one of the three bus interfaces. The Host Transaction Queue 216 bridges transactions and operations to the Host PCI Master 206 onto the Host PCI Bus 102. The Secondary PCI Transaction Queue 220 bridges transactions to the Secondary PCI Master 226 onto the secondary PCI Bus 108. Finally, the Memory Transaction Queue 212 bridges memory accesses to the Memory Controller 210 and the SDRAM Memory 104. Certain of the Transaction Queues also communicate directly between the two PCI Slaves 204 and 228, the I2O control block 214 and the two DMA Engines 222.

In carrying out its function of bridging each of the bus interfaces, the Transaction Queues perform various sub-functions. First, all PCI master operations can be initiated by the associated transaction queue. The appropriate transaction queue sends a start pulse and all necessary transaction information in order to enable the PCI master to initiate a transaction. In addition, the Transaction Queues perform conflict resolutions among conflicting access requests. Each respective transaction queue determines which requesting source has access using a predetermined priority scheme. A higher priority request is given immediate access to the queue while lower priority request are held and retried for later acceptance. The Transaction Queues are also capable of determining how much data to pre-fetch for certain types of accesses from system devices which have known characteristics. Finally, the memory transaction queue 212 controls memory access requests to and from the SDRAM 104 by sending read and/or write instructions for the memory controller 210 to execute.

The PCI Profilers 202 and 224 are used to determine the amount of data that the transaction queue should pre-fetch for certain transactions on a per device basis. The transaction queue receives a selected profile for each transaction from its associated profiler.

The primary function of the Memory Controller 210 is to service memory requests from the Memory Transaction Queue 212. Specifically, the Memory Controller 210 translates instructions from the Memory Transaction Queue 212 into the proper format of read and/or write requests. The bus/memory interface device 106 supports all SDRAM architectures of varying density and speed by having registers define the number of row and column address bits and certain delay parameters.

Implemented within the bus/memory interface device 106 can be a data protection scheme for RAID (redundant array of inexpensive drives) systems which provides a technique of allowing the system to experience multi-drive failures. Specifically, a multiplier is provided in connection with the Memory Transaction Queue 212 to extend the capabilities of typical RAID operations. RAID operations using a multiplier are described in detail in a commonly-assigned U.S. Patent Application, entitled MEMORY INTERFACE CONTROLLER FOR DATUM RAID OPERATIONS WITH A DATUM MULTIPLIER, previously incorporated herein by reference.

All transactions over the Host PCI Bus 102 and the Secondary PCI Bus 108 communicating with the bus/memory interface device 106 are prioritized according to an arbitration algorithm compliant with the PCI Specification, 2.1 revision. The arbitration algorithm is controlled in the Host PCI Arbiter 208 and the Secondary PCI Arbiter 230.

The architectures shown in FIGS. 1 and 2 and described herein are merely illustrative and not exhaustive. It should be noted that any number of different specific architectures may be employed without departing from the present invention.

The bus/memory interface device 106 can be used for internal controller or external controller applications. For the internal controller application, the bus/memory interface device 106 is used as a bridge between a host PCI bus and an internal PCI bus. With the bus/memory interface device 106, data can be routed from an internal I/O controller coupled to a disk drive to an internal PCI bus, from the internal PCI bus to a cache memory, and from the cache memory to a host PCI bus which communicates with a host. The internal I/O controller can for example be a Fibre Channel controller or a SCSI controller. While in an internal controller application the bus/memory interface device 106 provides bridging functions to a host, in an external array controller application the bus/memory interface device 106 can provide other bridging functions such as bridging to a variety of I/O controllers and even to other bus/memory interface devices 106. Alternatively, in an external tape controller application, the bus/memory interface device 106 can be used primarily for interfacing a tape controller to a cache memory in connection with error code correction. A variety of internal and external controller applications using the bus/memory interface device 106 may be employed without departing from the present invention.

Figure 3:
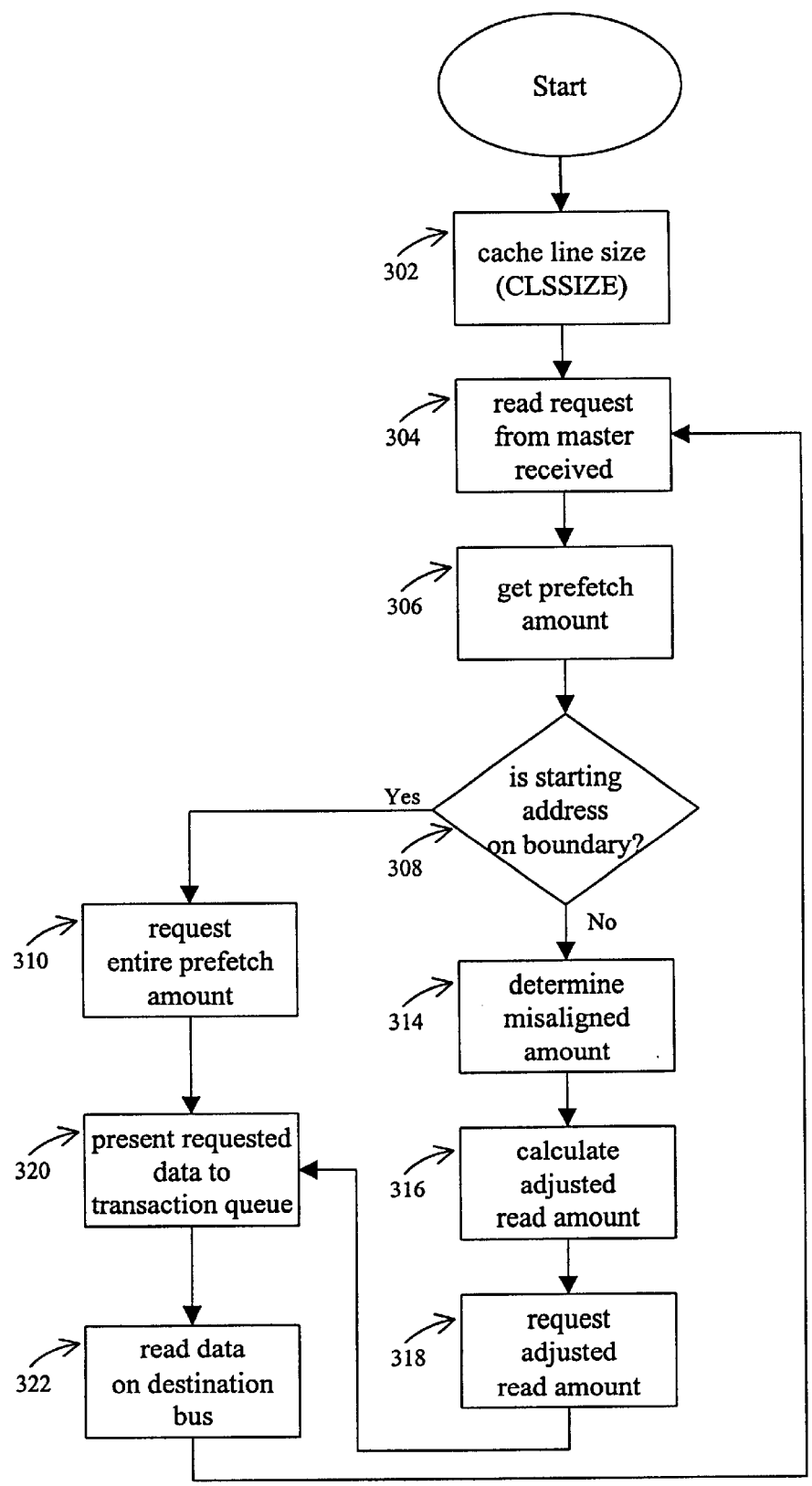
FIG. 3 is a flow diagram for cache line alignment.

Referring now to FIG. 3, illustrated is an embodiment of a technique for maintaining cache line alignment in response to a read command. Upon configuration, at step 302, cache line size is determined by polling the cache line size register, CLSSIZE, a PCI configuration register. The CLSSIZE register specifies the system memory cache line size in units of 32-bit words. According to an embodiment, cache line sizes of 0-bytes, 32-bytes, or 64-bytes may be selected. Generally, memory cache line size is maintained during operation of the bridge device, however, one skilled in the art would understand that cache line size may be reconfigured during certain periods of operation.

Continuing, at step 304, a read request is received from an external master device situated on either the host PCI bus 102 or the internal PCI bus 108, for example. Depending upon the location of the master device on either the host PCI bus 102 or the internal PCI bus 108, either the primary PCI profiler 202, or the secondary PCI profiler 222, respectively, identifies the particular master that has issued the read request. For example, a read request issued by the host processor 100 is recognized by the primary PCI profiler 202 as a read request originating from a device on the host PCI bus 102.

The PCI profiler 202 or 224 determines the amount of data that should be read on the destination bus interface when the PCI slave 204 or 228 decodes a read command from a particular device. Those skilled in the art are familiar with address decoding techniques using base and limit address registers. The profiler 202 knows which master on the host PCI bus 102 has issued the read request based upon the grant that the arbiter 208 gave during its bus arbitration process. PCI bus arbitration is as commonly understood in the industry.

PCI bus grant signals are latched during the address phase of each PCI transactions to determine which device has ownership of the bus. A device number is used by the profiler 202 or 224 to select the profile for that particular transaction. The selected profile is then used to determine the prefetch amount of data to be loaded into the transaction submit queue 212, 216 or 220 along with the other transaction submit data from the PCI slave module 204 or 228. Once the initiating master is identified, the profiler 202 or 224, at step 306, obtains the appropriate prefetch data amount value from the configuration register for the requesting master. Selection of the particular register of the configuration registers 218 is discussed in more detail below. For simplicity, reference to a configuration register will generically refer to information within the configuration register 218 associated with the particular requesting master. Returning, this prefetch amount value is used to determine the amount of data that the transaction queue 212, 216 or 220 should actually prefetch in response to a read transaction on a per device basis.

Normally, it is the prefetch amount of data that is returned in response to the read request. However, a read request may identify data beginning in between cache-line boundaries. Since the prefetch amount identifies an amount of data calculated from the start of the requested data, if the start address of the requested data is misaligned with a cache-line boundary, then subsequent continuing read operations to the same data block will also be misaligned. This is illustrated in more detail below in connection with FIGS. 4 and 5.

Continuing, the profiler 202 or 224, at step 308, then determines whether the starting address of the read request is on a cache line boundary. At step 310, if the read request begins on a cache line boundary, the profiler 202 or 224 requests the entire amount of the data that is profiled for prefetch for that particular requesting master (i.e., the prefetch amount indicated in the configuration register for that master).

If the starting address for the read request is misaligned with respect to the cache line boundary, control precedes to step 314 where the misaligned location is determined. Specifically, based on the cache line size determined in step 302, the profiler 202 or 224 determines the difference between the starting address of the request and the nearest cache line boundary outside of the data block (shown in more detail in connection with FIGS. 4 and 5). This misalignment value is used in step 316 to calculate the adjusted read amount to be retrieved. In an embodiment, the misalignment amount is subtracted from the prefetch amount taken from the configuration register for the requesting master. An adjusted read amount is determined such that the ending address will fall on a cache line boundary.

For example, turning to FIG. 4, for a cache line size of 64-bytes, the profiler 202 polls the appropriate register, discussed in more detail in connection with FIG. 6, in the PCI configuration register module 218 that corresponds to the requesting device to determine the amount of data to prefetch for that device. In an embodiment, the host processor 100 is programmed to cause a prefetch of 256 bytes of data in response to a read request issued by the host processor 100. In some systems, the host processor 100 is not configured for maintaining alignment with cache-line boundaries in memory in connection with issuing read requests. As such, a read request from the host processor 100 may begin at a starting address falling between cache line boundaries at the 64-byte cache-line intervals. For example, the starting address for a request to a first block of data in memory may be misaligned 16 bytes from the beginning of the nearest cache line boundary outside the data block, amount Ⓐ. The profiler 202 determines the misaligned amount Ⓐ from the starting address of the read request to the nearest beginning cache line boundary outside the data block. The profiler 202 subtracts the 16 byte misaligned amount from the prefetch amount value that is preset in the configuration register to determine an adjusted read amount. In this case, the adjusted read amount is determined from 256 bytes as the prefetch amount indicated in the configuration register minus the 16 bytes that the starting address of the read request is misaligned from the nearest cache line boundary. Thus, instead of automatically prefetching the 256 bytes as initially indicated in the configuration register, the profiler 202 issues at step 318 a request for the adjusted read amount of 240 bytes.

The adjusted read amount causes the next read operation, indicated a memory location ②, of the continuing large data block 1 to issue at the start of a cache line boundary. Thereafter, successive read operations, ②–⑦, to the same data block cause the profiler 202 to request the prefetched amount indicated in the configuration register. As long as the cache line boundaries are set as a multiple of the prefetch read amounts, the successive operations will begin and end on cache line boundaries. Data returned in excess of the particular data block requested is ignored by the requestor device.

Figure 4:
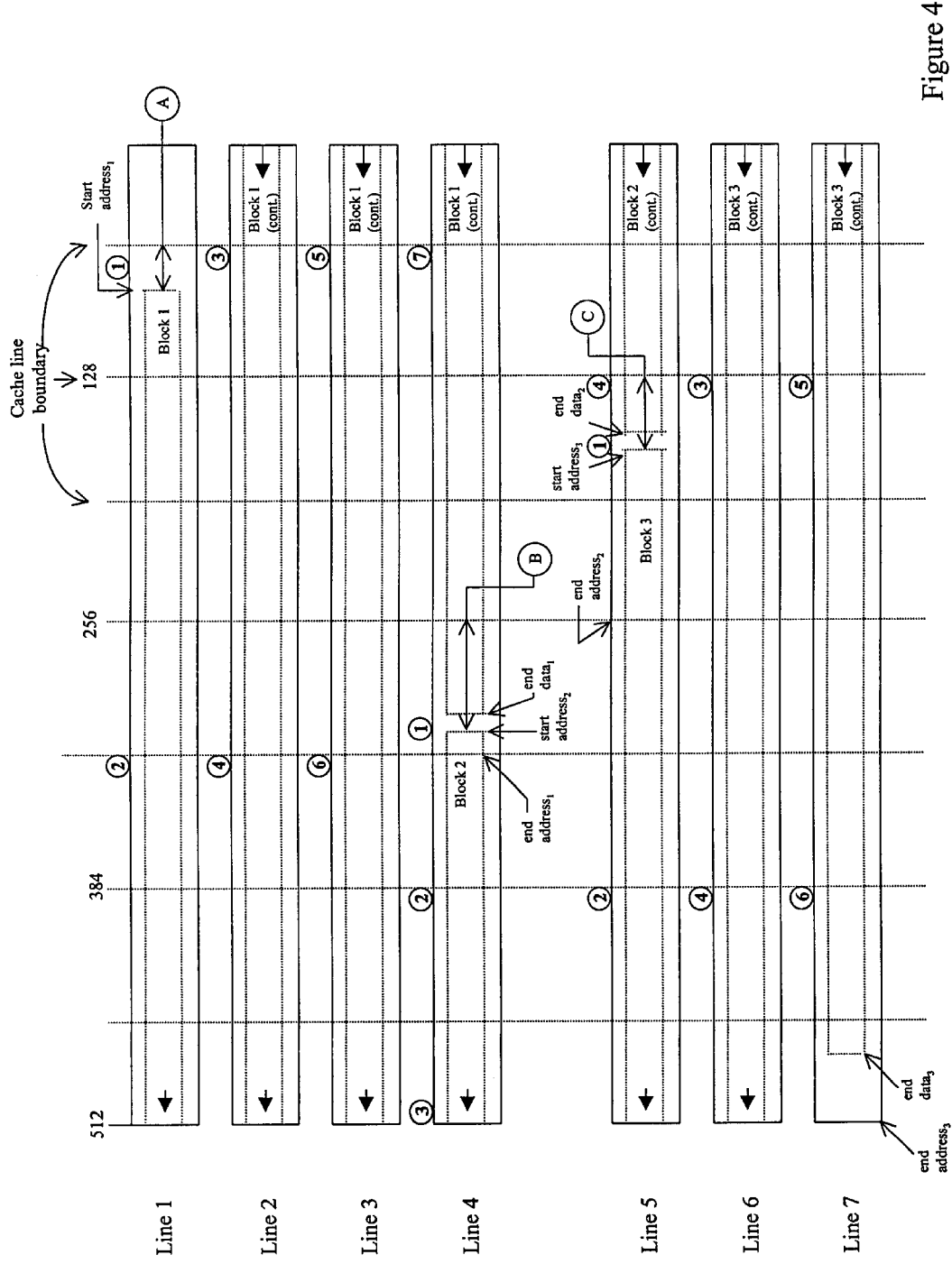
FIG. 4 is a memory map of multiple data blocks.

In conjunction with FIG. 4, FIG. 5 describes the response to the read requests discussed above. As shown, after the misaligned amount Ⓐ of 16 bytes is determined and an adjusted read amount of 240 bytes is returned to the requesting master, the memory controller 210 via the bridge device 106 returns the amount of data indicated in the configuration register for the requesting master, in this case 256 bytes. This prefetch amount of data is successively retrieved from memory and presented to the appropriate bus until the end of the data block is reached. The host memory controller is thus able to operate in an improved efficiency mode by maintaining alignment with the cache line boundaries.

A subsequent read request from either the same or a different requesting master may be processed by the bridge device 106 after the end of the first data block is reached. FIG. 4 and FIG. 5 illustrate subsequent read requests to data block 2 and data block 3. Data blocks 2 and 3 are processed in the same manner as is data block 1. As with data block 1, a misaligned amount Ⓑ is determined from the starting address of a request to data block 2. In this example the misaligned amount Ⓑ is 48 bytes from the nearest cache line boundary occurring outside the requested data block. This misaligned amount Ⓑ is subtracted from the prefetch amount that is pre-configured for the requesting master. In this example, a different master has issued the read request for data block 2 then for data block 1. The new requesting master has a different prefetch value of 128 bytes. Thus the misaligned amount Ⓑ of 48 bytes is subtracted from the prefetch amount of 128 bytes to result in an adjusted read amount of 80 bytes at operation ① for block 2. Because this adjusted read amount aligns the end of the read operation ① with a cache line boundary, subsequent read operations ②–⑦ for block 2 return the preconfigured prefetch amount of 128 bytes until after the end data$_2$ is reached.

The same process occurs for a read request issued by yet a different master for data block 3. A misaligned amount Ⓒ of 32 bytes is subtracted from the 256 byte prefetch amount for the particular requesting master. The adjusted read amount of 224 bytes for operation ① aligns the end address of the data with a cache-line boundary. Thereafter, operations ②–⑥ return the prefetch amount until after the end data$_3$ address is reached. As described, for all read requests, data returned in excess of the end data$_2$ for block 2 and end data$_3$ for block 3 is ignored.

As can be seen in connection with the read request to data block 1 with reference to FIG. 5, a prefetching scheme without the benefit of the disclosed technique can perpetuate inefficient memory usage over a large number of responsive read operations. By initially responding with an adjusted read amount, subsequent responsive read operations take advantage of the prefetching efficiencies together with maximizing efficient memory controller operations by maintaining cache line alignment.

Continuing at step 320 of FIG. 3, the adjusted read amount is then presented to the transaction queue 216, where at step 322, it is then read on the destination bus, in this case it would be the internal PCI bus 108. As indicated, upon a next or subsequent read request, control returns to step 304. Because an adjusted read amount was returned for the previous operation, the next read request will fall at a cache line boundary. Thus, at step 308, subsequent read requests for the same data block causes the profiler 202 to request the entire prefetched amount at step 310. Because subsequent read requests fall on cache line boundaries, the profiler 202 will continually respond with the prefetched data amount until the end of the data block is reached.

Figure 6:
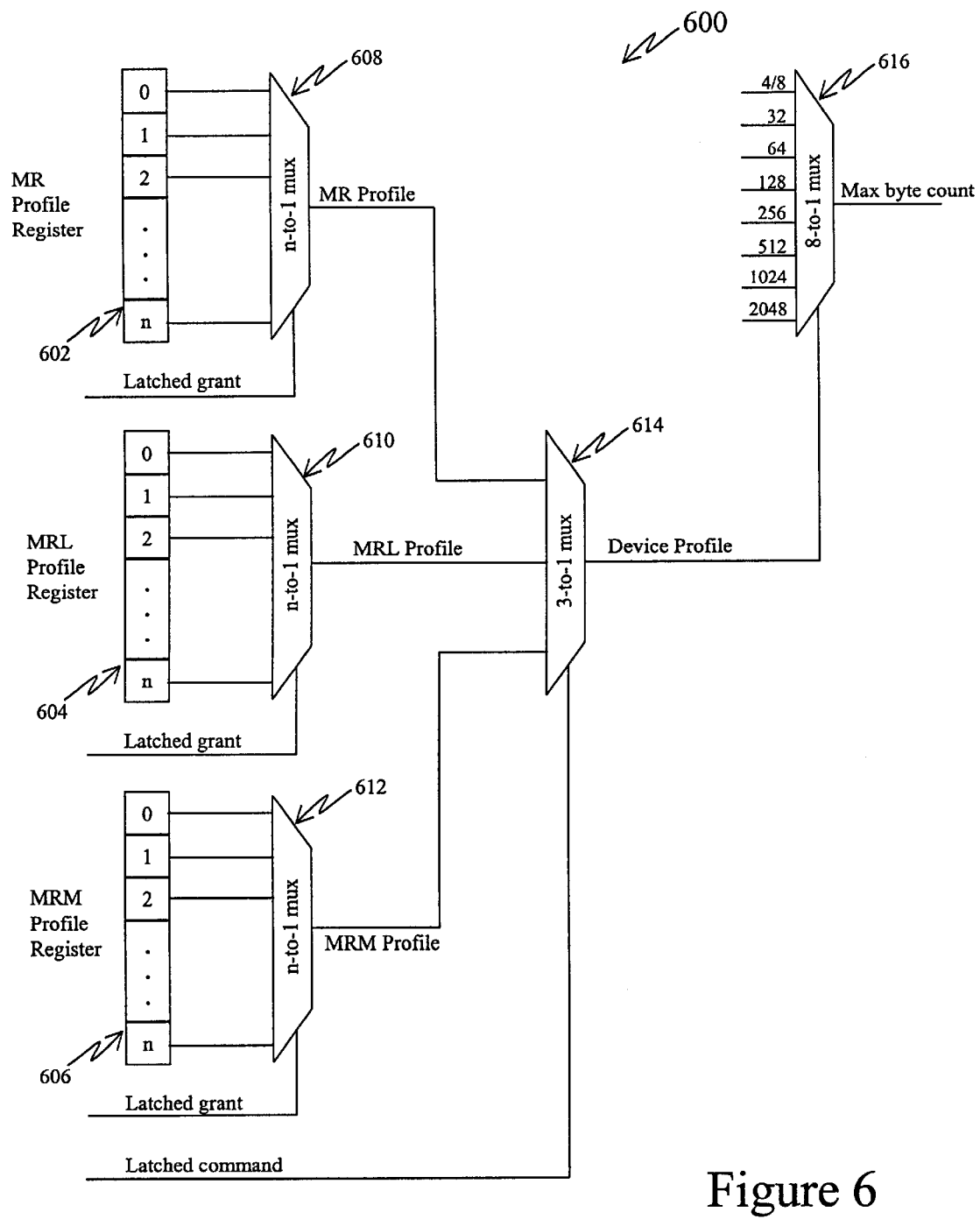
FIG. 6 is a block diagram illustrating an exemplary register decode block.

Turning to FIG. 6, shown is an exemplary block diagram illustrating a prefetch logic circuit 600. The PCI device profiler 202 or 224 is used to determine the amount of data that a transaction queue 212, 216 or 220, should prefetch for transactions on a per device basis. Separately programmable device profiles exist for the memory read (MR), memory read line (MRL), and memory read multiple (MRM) commands. Those skilled in the art are familiar with PCI bus transactions using the MR, MRL and MRM commands.

The PCI bus grant signals are latched during the address phase of each PCI transaction to determine which device has ownership of the bus. The command type is used to select which profile register, the MR profile register 602, the MRL profile register 604 or the MRM profile register 606, will be accessed to determine the profile for the particular transaction. The device number then is used to select a profile within the accessed profile register. Accordingly, one embodiment, the profile register 602, 604 and 606 contain multiple profiles. The resulting profile from the selected profile register then is used to select the maximum byte count to prefetch for that transaction. Once the maximum byte count is decoded, it is adjusted according to the technique previously discussed in order to maintain cache line boundaries. In a disclosed embodiment prefetch values of 4, 8, 32, 64, 128, 256, 512, 1024 and 2048 bytes may be selected. Although the disclosed embodiment is discussed in terms of the profile registers that are programmed initially upon configuration, it should be understood that these registers may be reprogrammed for any particular device or in other ways during PCI transactions.

Thus the disclosed technique utilizes a modified data prefetching scheme to allow for efficient memory controller operation. Efficient memory operation is provided by maintaining alignment with cache line boundaries in response to a read command. A prefetching scheme is used to limit the amount of operations needed to respond to a read command. In addition, the prefetch amount is initially adjusted where the starting address of the read request falls in between cache line boundaries. The adjusted read amount is determined based on the misaligned portion from the starting address of the read request to the nearest cache line boundary outside of the requested data block, such that the adjusted read amount ends on a cache line boundary. Subsequent read requests to the same data block will thereby begin at the last cache line boundary and end upon a subsequent cache line boundary by providing the pre-configured prefetch data amount corresponding to the requesting master device. Memory controller operation efficiency is maximized by allowing the memory control to operate and respond to read requests in data amounts maintaining cache line alignment. Reliably maintaining cache line alignment also improves bus utilization. By preventing an initial misaligned starting read request to perpetuate over a large data block, continuous inefficiency resulting multiple cache-line misalignment is avoided.

The foregoing disclosure and description of various embodiments are illustrative and explanatory thereof, and various changes in the architecture, controllers, busses, data paths, caches, addressing, commands, circuitry, components and order of process steps, as well as in the details of the illustrated software and hardware and construction and method of operation may be made without departing from the scope of the invention.

What is claimed is:

1. A method of communicating between computer devices, comprising the steps of:
   receiving a read request for data stored in a memory device;
   identifying a requesting device;
   determining a prefetch amount of data for the requesting device;
   adjusting the prefetch amount of data to return an amount of data ending on a memory cache-line boundary determined by a cache line size of data; and
   providing the adjusted prefetch amount of data to the requesting device in response to the read request.

2. The method of claim 1, wherein the step of determining a prefetch amount of data, further comprises the step of:
   determining a prefetch amount of data based on device characteristics of the requesting device.

3. The method of claim 1, wherein the step of determining a prefetch amount of data, further comprises the step of:
   polling a register containing a value representing the prefetch amount of data for the requesting device.

4. The method of claim 1, wherein the step of adjusting the prefetch amount of data, further comprises the steps of:
   calculating a misaligned value from the starting address of the read request to the nearest cache-line boundary beginning; and
   subtracting from the prefetch amount of data the misaligned value such that the read request ends on a memory cache line boundary.

5. The method of claim 1, further comprising the step of:
   successively providing the prefetch amount of data to the requesting device in response to subsequent read requests for a block of data until an end of the block of data is reached, wherein successively providing the prefetch amount of data maintains cache-line alignment.

6. The method of claim 1, wherein a cache-line of data is selectably configured to comprise 32 bytes or 64 bytes of data.

7. The method of claim 1, wherein the computer devices reside on multiple computer buses having multiple computer bus interfaces.

8. The method of claim 6, wherein a bridge device is located between the multiple computer bus interfaces, the bridge device receives the read request and provides data in response to the read request.

9. The method of claim 1, further comprising:
   determining the cache line size.

10. A computer bridge device, the bridge device having an internal memory containing executable computer instructions that when executed perform the steps comprising:
    receiving a read request for data stored in a memory device;
    identifying a requesting device that issued the read request;
    determining a prefetch amount of data for the requesting device;
    adjusting the prefetch amount of data to return an amount of data ending on a memory cache-line boundary determined by a cache-line size; and
    providing the adjusted prefetch amount of data to the requesting device in response to the read request.

11. The computer bridge device of claim 10, wherein the step of determining a prefetch amount of data comprising the step of:
    determining a prefetch amount of data based on device characteristics of the requesting device.

12. The computer bridge device of claim 10, wherein the step of determining a prefetch amount of data further comprises the step of:
    polling a register containing a value representing the prefetch amount of data for the requesting device.

13. The computer bridge device of claim 10, wherein the step of adjusting the prefetch amount of data, further comprises the steps of:
    calculating a misaligned value from the starting address of the read request to the nearest cache line boundary beginning; and
    subtracting the prefetch amount of data by the misaligned value such that the read request ends on memory cache line boundary.

14. The computer bridge device of claim 10, the executable computer instructions contained in the bridge device when executed performing the additional step of:
    detecting the cache line size.

15. The bridge device of claim 13, wherein the calculating step comprises the step of:
    calculating the misaligned value by subtracting a start address from the prefetch amount of data.

16. A computer system for communicating among computer devices, comprising:
    a processor;
    a first computer bus coupled to the processor;
    a memory;
    a second computer bus coupled to the memory; and
    a bridge device coupled to the first computer bus and the second computer bus, the bridge device having an internal memory containing executable computer instructions which when executed perform the steps comprising:

receiving a read request for data stored in a memory device;

identifying the requesting device that issued the read request;

determining a prefetch amount of data for the requesting device;

adjusting the prefetch amount of data to return an amount of data ending on a memory cache-line boundary determined by a cache-line size; and providing the adjusted prefetch amount of data to the requesting device in response to the read request.

17. The computer system of claim 16, the step of determining a prefetch amount of data comprising the step of:

determining a prefetch amount of data based on device characteristics of the requesting device.

18. The computer system of claim 17, wherein the step of determining a prefetch amount of data further comprises the step of:

polling a register containing a value representing the prefetch amount of data for the requesting device.

19. The computer system of claim 16, wherein the step of adjusting the prefetch amount of data, further comprises the steps of:

calculating a misaligned value from the starting address of the read request to the nearest cache line boundary beginning; and subtracting the prefetch amount of data by the misaligned value such that the read request ends on memory cache line boundary.

20. The computer system of claim 16, the executable computer instructions, contained in the bridge device when executed performing the additional step of:

detecting the cache line size.

21. The computer system of claim 19, wherein the calculating step comprises the step of:

calculating the misaligned value by subtracting a start address from the prefetch amount of data.

22. A computer bridge device, comprising:

means for receiving a read request for data stored in a memory device;

means for identifying a requesting device that issued the read-request;

means for determining a prefetch amount of data for the requesting device;

means for adjusting the prefetch amount of data to return an amount of data ending on a memory cache line boundary determined by a cache line size; and means for providing the adjusted prefetch amount of data to the requesting device in response to the read request.

23. The computer bridge device of claim 22, wherein the determining means determines a prefetch amount of data based on device characteristics of the requesting device.

24. The computer bridge device of claim 22, wherein the determining means polls a register containing a value representing the prefetch amount for the requesting device.

25. The computer bridge device of claim 22, wherein the adjusting means calculates a misaligned value from the starting address of the read request to the nearest cache-line boundary beginning and subtracts from the prefetch amount of data the misaligned value such that the read request ends on a memory cache line boundary.

26. The computer bridge device of claim 22, further comprising:

means for successively providing the pre fetch amount of data to the requesting device in response to subsequent read requests for a block of data until an end of the block of data is reached, wherein successively providing the pre fetch amount of data maintains cache line alignment.

27. The computer bridge device of claim 22, wherein a cache-line of data is selectably configured to comprise 32 bytes or 64 bytes of data.

28. The computer bridge device of claim 22, wherein the computer devices reside on multiple computer buses having multiple computer bus interfaces.

29. The computer bridge device of claim 27, wherein a bridge device is located between the multiple computer bus interfaces, the bridge device receives the read request and provides data in response to the read request.

30. The computer bridge device of claim 22, further comprising:

means for determining the cache line size.

* * * * *